United States Patent
Ban et al.

(10) Patent No.: US 7,836,282 B2
(45) Date of Patent: Nov. 16, 2010

(54) METHOD AND APPARATUS FOR PERFORMING OUT OF ORDER INSTRUCTION FOLDING AND RETIREMENT

(75) Inventors: Oliver Keren Ban, Austin, TX (US); Neo Hock Keng, Singapore (SG); Wo Heem Tan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/961,091

(22) Filed: Dec. 20, 2007

(65) Prior Publication Data

US 2009/0164757 A1 Jun. 25, 2009

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................... 712/226
(58) Field of Classification Search ................... 712/226
See application file for complete search history.

(56) References Cited

U.S. PATENT DOCUMENTS

| | | | |
|---|---|---|---|
| 5,163,139 A | 11/1992 | Haigh et al. | |
| 5,878,242 A | 3/1999 | Olson et al. | |
| 6,026,485 A | 2/2000 | O'Connor et al. | |
| 6,125,439 A | 9/2000 | Tremblay et al. | |
| 6,237,086 B1 | 5/2001 | Kappala et al. | |
| 6,301,651 B1 | 10/2001 | Chang et al. | |
| 6,775,765 B1 | 8/2004 | Lee et al. | |
| 6,832,307 B2 | 12/2004 | Richardson | |

OTHER PUBLICATIONS

Shen et al.; Modern Processor Design: Fundamentals of Superscalar Processors; Beta Edition; 2003; pp. 173-179.*
McGhan et al., "PicoJava: A Direct Execution Engine for Java Bytecode", IEEE Computer, Oct. 1998, pp. 22-30.

* cited by examiner

*Primary Examiner*—Eddie P Chan
*Assistant Examiner*—Corey Faherty
(74) *Attorney, Agent, or Firm*—Yee & Associates, P.C.; Steven L. Bennett

(57) ABSTRACT

The illustrative embodiments described herein provide a computer implemented method, apparatus, and computer program product for increasing a number of instructions per clock cycle associated with a processor. The illustrative embodiments fold a plurality of non-sequential instructions within the set of sequential order instructions to form a folded instruction. The folded instruction is executed to form an executed instruction. The executed instruction is placed in a reorder buffer. The instructions within the reorder buffer are written to a register based on the sequential order of execution within the set of sequential order instructions.

17 Claims, 4 Drawing Sheets

METHOD AND APPARATUS FOR PERFORMING OUT OF ORDER INSTRUCTION FOLDING AND RETIREMENT

BACKGROUND OF THE INVENTION

1. Field of the Invention

The present invention relates generally to the data processing field. Still more particularly, the present invention relates to a computer implemented method, apparatus, and computer program product for performing out of order instruction folding and out of order instruction retirement.

2. Description of the Related Art

A processor's performance is measured by the number of instructions performed per clock cycle (IPC). An instruction is an order given to a computer processor by a computer program. At the lowest level, each instruction is a sequence of 0s and 1s that describes a physical operation the computer is to perform, such as "Add". In addition, the instruction may specify the storage areas called registers that may contain data used in carrying out the instruction, or the location in computer memory of data. The clock cycle is the time between two adjacent pulses of the oscillator that sets the tempo of the computer processor. The number of pulses per second is known as the clock speed, which is generally measured in MHz (megahertz, or millions of pulses per second) and in GHz (gigahertz, or billions of pulses per second).

Pipelining is an implementation technique for increasing the number of instructions performed per cycle. Pipelining can be thought of as an assembly line for computer instructions. The pipeline is divided into segments called stages, whereby multiple instructions are overlapped in execution. A typical pipeline consists of five stages: an instruction fetch stage, an instruction decode stage, an execution stage, a memory access stage, and a write back stage.

In the case of a simple processor architecture, such as a scalar processor, one instruction per clock cycle is executed. In other words, only one instruction at a time can enter the pipeline. The instructions inside the pipeline move to the next stage after the slowest instruction completes its stage. The optimal performance increase for a pipelined instruction set over an unpipelined instruction set would be equal to a multiplicity factor of the number of stages employed in the pipeline. However, most instruction sets have data dependencies that do not allow for full pipelining. Therefore, the optimal performance of the pipelined instruction set is generally not achieved. In addition, other factors limit the performance increase associated with the pipeline, such as, limitations arising from pipeline latency, an imbalance among the pipe stages, pipeline hazards, and pipelining overhead.

Another method of increasing the number of instructions performed per clock cycle is to fold instructions. Instruction folding occurs when two more instructions are executed in the same clock cycle. Instruction folding may be performed in a superscalar processor having multiple versions of each functional unit to enable execution of more than one instruction in parallel. However, instruction folding is costly because additional logic gates are required to implement data dependency checks and time delays for depending instruction.

SUMMARY OF THE INVENTION

The illustrative embodiments provide a computer implemented method, apparatus, and computer program product for increasing a number of instructions per clock cycle associated with a processor. The illustrative embodiments fold a plurality of non-sequential instructions within the set of sequential order instructions to form a folded instruction. The folded instruction is executed to form an executed instruction. The executed instruction is placed in a reorder buffer. The instructions within the reorder buffer are written to a register based on the sequential order of execution within the set of sequential order instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

DETAILED DESCRIPTION OF THE PREFERRED EMBODIMENT

Figure 1:
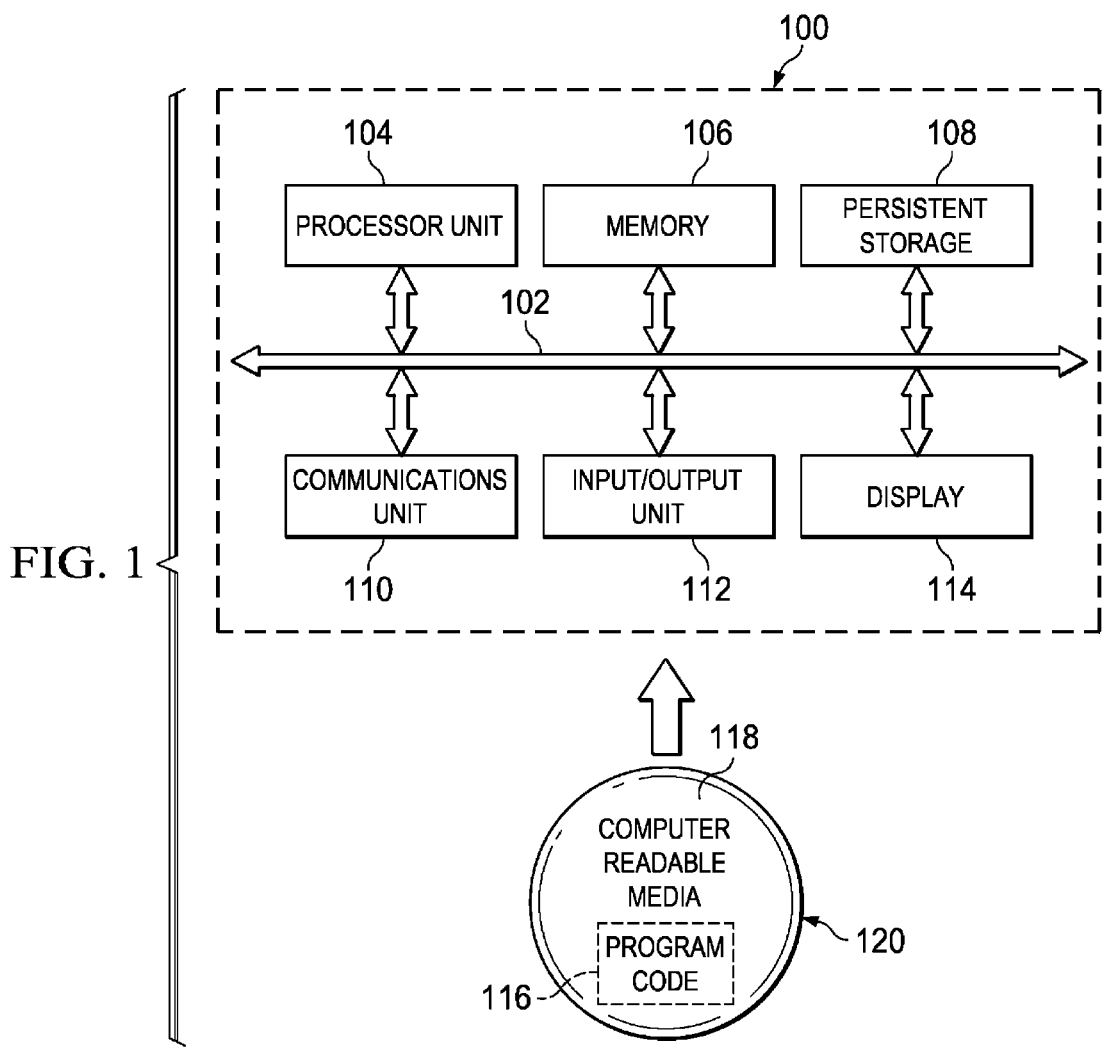
FIG. 1 is a diagram of a data processing system in accordance with an illustrative embodiment.

FIG. 1 is a diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

The illustrative embodiments may be implemented in a processor, such as a processor in processor unit 104. The processor may be, but is not limited to, a superscalar processor having multiple versions of each functional unit to enable execution of many instructions in parallel. The illustrative embodiments provide a method for increasing the number of instructions per clock cycle associated with processor.

Currently, only sequential instructions are folded to avoid data conflicts/hazards among the instructions within the instruction set. An instruction may be folded with a following sequential instruction if a determination is made that there is no data hazard or other types of conflicts. If there is a conflict between the instruction and the sequential instruction, then the instruction is not folded with the sequential instruction and is executed independently.

The illustrative embodiments recognize that a mechanism for folding of non-sequential order instructions would increase the number of instructions per clock cycle. In an illustrative example, instruction 1 and instruction 2 may not be folded due to conflicts, but because instruction 6 has no conflicts with instruction 1, the illustrative embodiments recognize that instruction 1 and instruction 6 may be folded and executed in parallel. The results associated with executing the instructions are placed in a reorder buffer. The results within the reorder buffer are retired/written back to a register based on the sequential order of execution within the original instruction set.

In addition, the illustrative embodiments recognize that store instructions do not require the use of an arithmetic logic unit and logic/arithmetic instructions do not write back results during the write back cycle of a pipelined process, as will be further described below. Accordingly, in one illustrative embodiment a computer implemented method is provided for folding a store instruction and a logic/arithmetic instruction into one instruction for execution. Thus, the illustrative embodiment increases the number of instructions performed per clock cycle associated with process 104.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
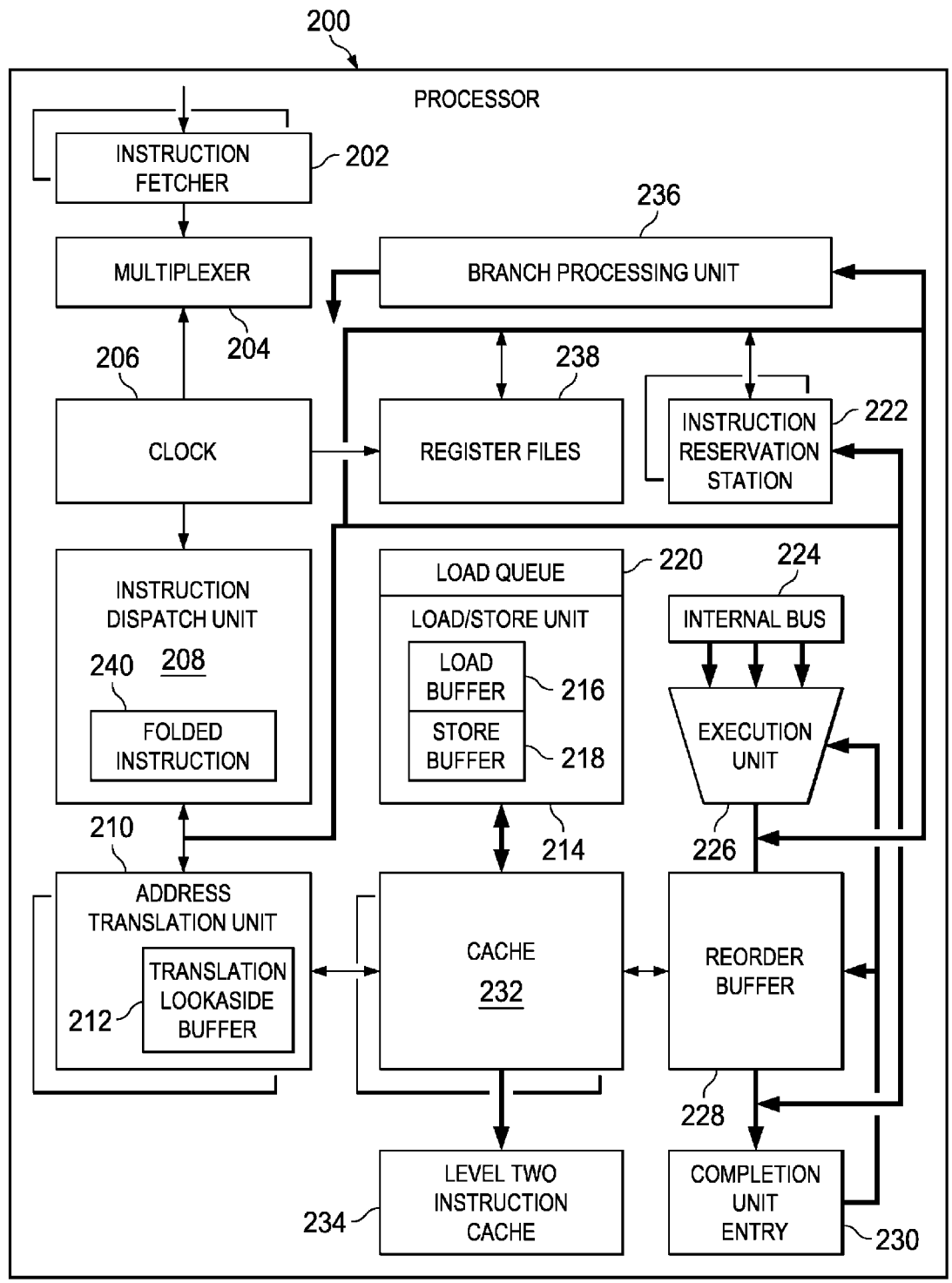
FIG. 2 is a diagram of a processor in accordance with an illustrative embodiment.

With reference now to FIG. 2, components of a processor are depicted in accordance with the illustrative embodiments. Processor 200 may be a superscalar processor, such as a processor in processor unit 104 shown in FIG. 1, in which illustrative embodiments may be implemented. Processor 200 may comprise of other components not depicted in FIG. 2, such as, but not limited to, additional logic circuitry, registers, and execution units for executing computer instructions. In addition, depicted components of processor 200 may be omitted, combined, or replaced in accordance with other illustrative embodiments.

In the depicted illustrative example, processor 200 comprises of instruction fetcher 202, multiplexer 204, clock 206, instruction dispatch unit 208, address translation unit 210, translation look aside buffer 212, load/store unit 214, load buffer 216, store buffer 218, load queue 220, instruction reservation station 222, internal bus 224, execution unit 226, reorder buffer 228, and completion unit entry 230.

Instruction fetcher 202 fetches a sequence of instructions from main memory. Instruction fetcher 202 increases a counter that indicates the next address to fetch after fetching an instruction. In addition, instruction fetcher 202 tags each instruction with a group identifier (GID) and a target identifier (TID). The target identifier and group identifier assignment is associated with the order in which the instruction fetched. The target identifier and group identifier assignment is also associated with pre-decoded information related to the instruction type and data dependency. The target identifier and group identifier are appended to the instruction to identify the associated groups and the target groups. The target identifier is generated according to the destination register number associated with the instruction. The group identifier is generated according to instruction type, such as, but not limited to, load, store, and arithmetic type instructions.

Instruction fetcher 202 passes the instructions to multiplexer 204. Multiplexer 204 combines multiple streams of information/signals into a single complex signal.

Clock 206 controls the clock cycle of processor 200. The clock cycle is the time between two adjacent pulses of the oscillator that sets the tempo of the computer processor. The number of pulses per second is known as the clock speed, which may be measured in gigahertz (GHz) or billions of pulses per second.

In one illustrative embodiment, processor 200 is a superscalar processor having multiple versions of each functional unit to enable execution of more than one instruction in parallel. As a result, processor 200 may perform more than one instruction per clock cycle.

Instruction dispatch unit 208 uses clock 206 to dispatch instructions to internal bus 224 for execution by execution unit 226. In addition, instruction dispatch unit 208 uses address translation unit 210 for translating virtual addresses associated with application code and data into a physical memory address. Address translation unit 210 may employ a translation look aside buffer 212 (TLB). Translation look aside buffer 212 uses a page table for mapping virtual addresses to physical memory addresses to improve the speed of virtual address translation.

Instruction dispatch unit 208 dispatches load and store type instruction to load/store unit 214 for execution. Load/store unit 214 contains a load buffer 216 and a store buffer 218 for storing the dispatched load and store type instructions until execution. A buffer is a region of memory used to temporarily hold data while it is being moved from one place to another. Instructions within load buffer 216 are placed into an instruction queue, such as load queue 220 to await execution. A queue is a data structure that maintains an order for items within the queue. For example, load queue 220 may be, but is not limited to, a first in first out (FIFO) queue in which instructions are added to the bottom of the queue and removed from the top of the queue.

In addition, instruction dispatch unit 208 dispatches folded instructions, such as folded instruction 240. In one illustrative embodiment, folded instruction 240 may consist of an arithmetic instruction folded with a store instruction. In another illustrative embodiment, folded instruction 240 may consist of two or more out of order instructions. An out of order instruction is an instruction that is not executed in the sequential order of an unpipelined instruction set. Folded instruction 240 is passed to internal bus 224 for execution. Internal bus 224 passes folded instruction 240 execution unit 226 for processing.

Instructions processed by execution unit 226 are placed in reorder buffer 228 for further processing by completion unit entry 230. Completion unit entry 230 is designed to further reorder the out of order dispatched instruction sequence to ensure that the instructions are retired in order. Reordering of the instructions is based on the associated group identifier. Completion unit entry 230 writes instructions within the reorder buffer to register files 238 based on the original sequential order of execution associated with the instruction set. For example, instructions 1 and instruction 4 may be folded for execution prior to executing instruction 2 and instruction 3. The results associated with the executed instructions are placed in the reorder buffer. Completion unit entry 230 will retire the instructions in the correct order of execution, such that instruction 1 is retired, then instruction 2, then instruction 3, and so forth. The term retire, as referenced herein, means storing the results of the instruction and deallocating the memory space in the reorder buffer associated with the retired instruction. The results of the retired instructions are stored to a register file.

In addition, data associated with the executed instructions may be stored in instruction reservation station 222. Instruction reservation station 222 may contain data for each type of instruction corresponding to an individual instruction. Instruction reservation station 222 may also update resources relating to the completion of the execution of an instruction.

Additionally, data associated with the executed instructions may be monitored by branch processing unit 236. Branch processing unit 236 monitors for an executed branch instruction. A branch instruction is a conditional instruction that may change the sequence of instruction execution and the instruction queue. Branch processing unit 236 utilizes the group identifier and target identifier associated with each instruction in processing the branch instruction.

Processor 200 may also comprise of a number of cache memory, such as cache 232 and level two instruction cache 234. A cache is a memory location that is used to speed up certain computer operations by temporarily placing data, or a copy of it, in a location where it can be accessed more rapidly than normal. Cache 232 may be a level one cache in which data may be accessed at a higher rate than level two instruction cache 234.

Figure 3:
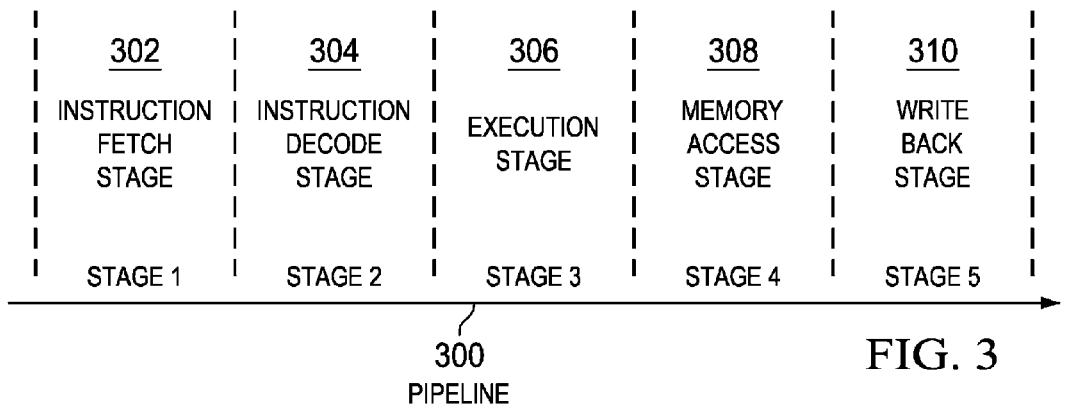
FIG. 3 is a diagram of a pipeline process for executing instructions in accordance with an illustrative embodiment.

With reference now to FIG. 3, a diagram depicting stages of a pipeline process for executing instructions is depicted in accordance with an illustrative embodiment. Pipeline 300 depicts a five stage pipeline. Pipeline 300 consists of instruction fetch stage 302, instruction decode stage 304, execution stage 306, memory access stage 308, and write back stage 310. Depending on the type of instruction being performed, the instruction may complete within three to five clock cycles.

During instruction fetch stage 302, an instruction is fetched from memory into the instruction register. The particular memory location that is fetched in these examples are determined by a counter. The counter is incremented after each instruction fetch to point to the next memory location. The instruction register is used to hold the instruction that will be needed on subsequent clock cycles.

During instruction decode stage 304, the instructions are decoded when the registry files are accessed. The instruction code is translated into an address usable by the processor. The output of the registers may be placed into other temporary registers for use in later clock cycles.

During execution stage 306, the arithmetic logic unit operates on the operands prepared in the prior cycle. Types of operations may include, but are not limited to, adding operands, performing a specified function, and computing the address of a branch instruction.

During memory access stage 308, memory is accessed if needed. The only instructions that are active during this cycle are load, store, and branch instructions.

In the case of a load instruction, data returned from memory is placed in a register. In the case of a store instruction, the data from a register is written into memory. For branch instruction that is taken, the memory referencing counter is replaced with the branch destination address.

During write back stage 310, the result of an executed instruction is written into the register file. The result may come from the memory system or the arithmetic logic unit output.

Figure 4:
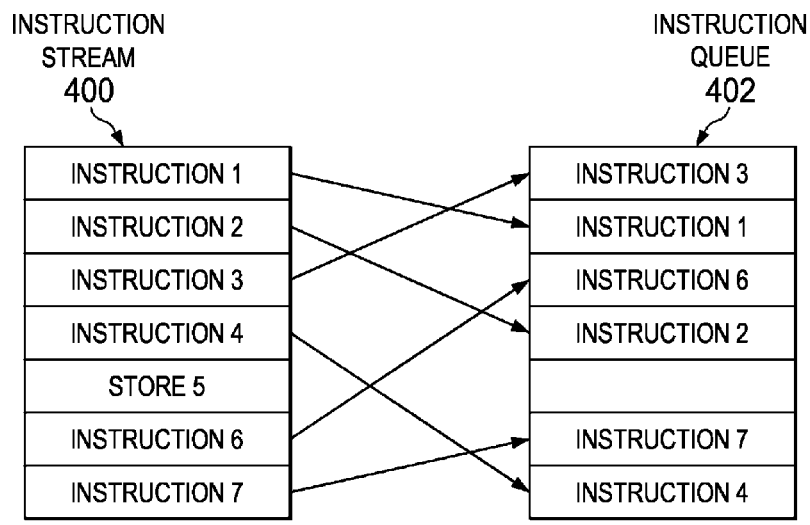
FIG. 4 is a diagram of an out of order instruction queue for dispatching instructions in accordance with an illustrative embodiment.

With reference now to FIG. 4, a diagram of an out of order instruction queue for dispatching instructions is depicted in accordance with an illustrative embodiment. Instruction stream 400 depicts a set of instructions. A set of instructions comprises of two or more instructions. Instruction queue 402 depicts an out of order instruction queue for dispatching the instructions within instruction stream 400 in and out of order sequence.

The set of instructions in instruction stream 400 are pre-decoded during the instruction fetch stage, such as instruction fetch stage 302 shown in FIG. 3. Dependencies between the instructions within the instruction set, such as, but not limited to, data dependencies are determined. In addition, store type instructions are separated from non-store type instructions. A non-store type instruction is any instruction that is not a store instruction. Non-store type instructions may include, but are not limited to, load instructions and arithmetic instructions, such as add, subtract, multiply or divide.

Currently, the load and store instructions are dispatched into a separate unit called a load and store unit to be processed separately, such as load/store unit 214 shown in FIG. 2. The illustrative embodiments recognize that because store instructions do not require the use of an arithmetic logic unit, the store instructions could be folded with a logic/arithmetic instruction and executed in parallel.

Accordingly, in one illustrative embodiment, a store instruction that follows immediately after a logic or arithmetic instruction is folded with the logic/arithmetic instruction. The folded instruction is dispatched into the execution unit together and the store instruction is executed in the same write back as the logic/arithmetic instruction. Therefore, the store instruction is retired in the same cycle as a logic/arithmetic instruction instead of during another clock cycle. Accordingly, the illustrative embodiments increase the number of instructions performed per clock cycle.

In another illustrative embodiment, a store instruction not immediately following a logic/arithmetic instruction may be folded out of order depending on the data dependencies between the instructions. The data dependencies between the instructions are determined in an earlier process during the instruction fetch stage. Additionally, the instructions within the instruction set may be performed out of order based on the prior determination of data dependencies between the instructions.

In another illustrative embodiment, the processor can process more store instructions per cycle by dispatching multiple store instructions into both the load/store unit as well as several execution unit. The potential number of instructions per cycle to increase would depend upon the number of integer and floating point execution units associated with the processor core.

Figure 5:
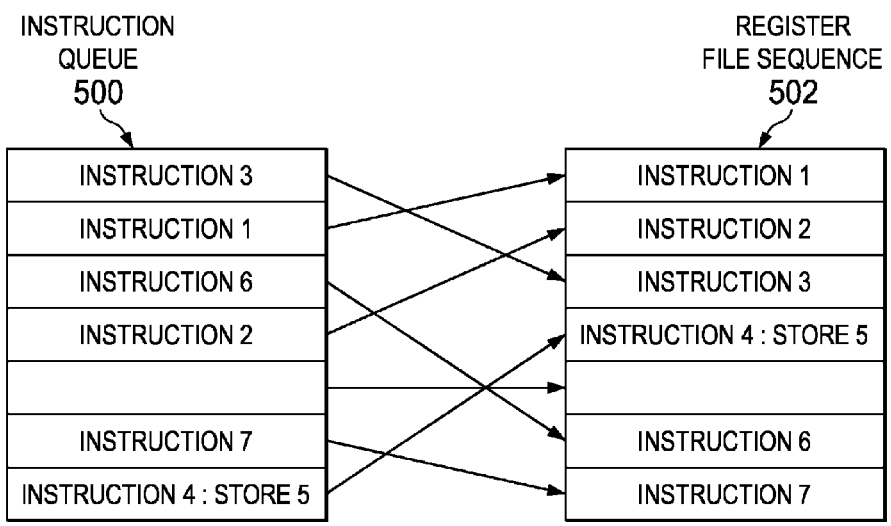
FIG. 5 is a diagram of an out of order instruction queue for writing back instructions in accordance with an illustrative embodiment.

With reference now to FIG. 5, a diagram of an out of order instruction queue for writing back instructions is depicted in accordance with an illustrative embodiment. Instruction queue 500 depicts an executed out of order instruction set. The instructions within instruction queue 500 are written back to a register of the processor. The target identifier and group identifier associated with each instruction within instruction queue 500 are used to reorder the completed instructions within the reorder buffer. The ordering process may be monitored by a branching unit, such as branch processing unit 236 shown in FIG. 2, to track and reorder the dispatched instructions into the original sequence before writing the results back into the register files, as depicted in register file sequence 502.

Figure 6:
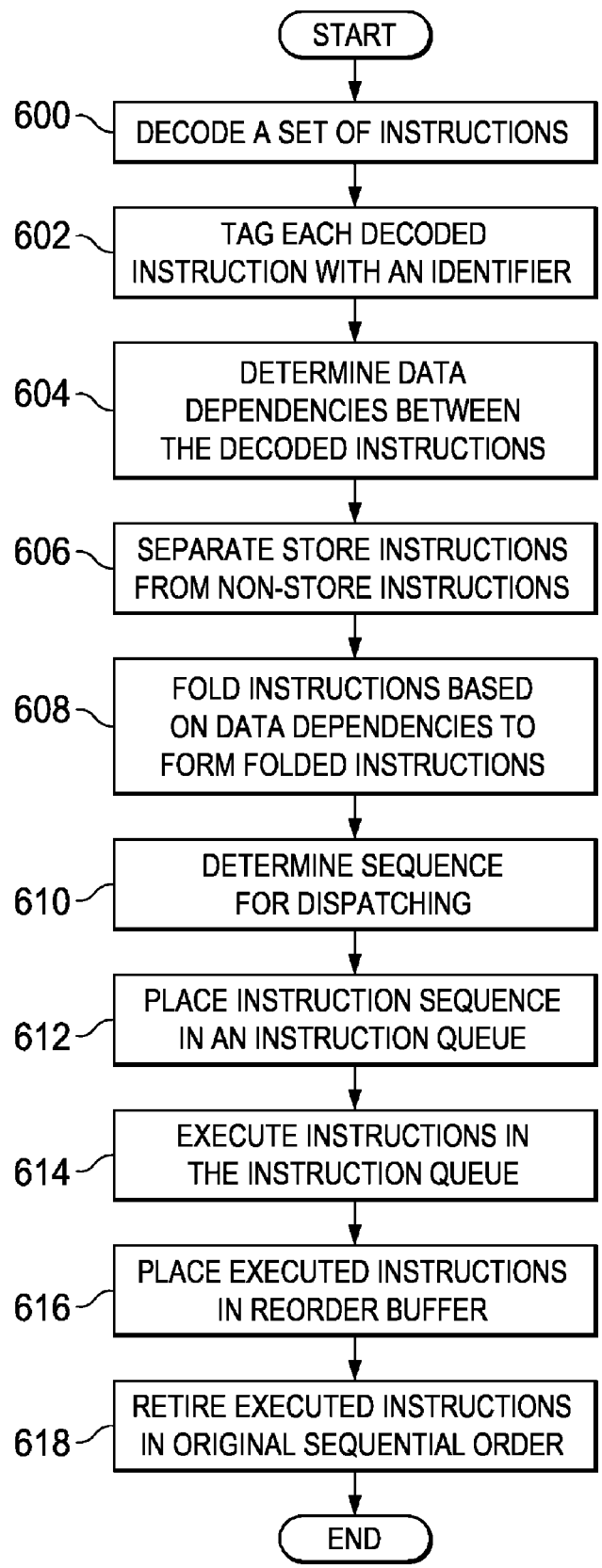
FIG. 6 is a flowchart of a process for increasing the number of instructions performed per clock cycle in accordance with an illustrative embodiment.

With reference now to FIG. 6, a flowchart of a process for increasing the number of instructions performed per clock cycle is depicted in accordance with an illustrative embodiment. The process of FIG. 6 may be implemented in a processor, such as processor 200 shown in FIG. 2.

The process begins by decoding a set of instructions (step 600). The instruction type and other data associated with the instruction are determined by decoding the instruction. The process tags each decoded instruction with an identifier (step 602). The identifier indicates the sequential order of execution associated with each instruction. In addition, the identifier may also comprise of a group identifier and a target identifier. The group identifier is used by the completion unit, such as completion unit entry 230 shown in FIG. 2, in retiring the out of order dispatched instructions. The target identifier is used to assist the dispatch unit, such as instruction dispatch unit 208 shown in FIG. 2, in dispatching the out of order instructions. Both the group identifier and target identifier are labeled after pre-decoding stage inside the instruction fetcher unit, such as instruction fetcher 202 shown in FIG. 2. The group identifier indicates the relationship/sequence order between the fetched instructions. The target identifier is assigned to label the target execution unit that the instruction is to be dispatched.

The process determines data dependencies between the decoded instructions within the set instructions (step 604). A data dependency exists when a subsequent instruction depends on results produced by an earlier instruction. Data dependencies may result in a data hazard. For example, a data hazard occurs when the pipeline changes the order of read/write accesses to operands so that the order differs from the order performed by sequentially executing instructions performed on an unpipelined processor.

In addition, the process separates store instructions from non-store instructions within the set of instructions (step 606). The store instructions may be folded, depending on data dependencies, with non-store instructions, such as, but not limited to, arithmetic instructions or logic instructions. The folded instruction is executed as one instruction in parallel. The folded non-store instruction, such as, the arithmetic instruction would be executed in the execution clock cycle. The folded store instruction is executed during the write back clock cycle of the instruction pipeline. Thus, two instructions are performed instead one, thereby increasing the number of instructions per cycle that is processed by the processor.

The process folds instructions within the set of instructions based on the determined data dependencies between instructions (step 608). For example, the process may fold a store instruction immediately following a logic/arithmetic instruction to be executed in parallel. Alternatively, the folded instructions may be performed in an out of order fashion and retired using the identifiers associated with each instruction.

In addition to out of order folding, the process may determine an efficient out of order instruction sequence for dispatching the instructions within the set of instructions (step 610). The process places the instruction sequence in an instruction queue for execution (step 612). The process executes the instructions in the instruction queue (step 614). The folded instruction comprising of a store and logic/arithmetic instruction is executed in parallel. The logic/arithmetic instruction is executed during the execution stage and the store instruction is executed during the write back cycle. Thus, the folded instruction results in one additional instruction being performed per clock cycle.

The process places the executed instructions in a reorder buffer, such as reorder buffer 228 shown in FIG. 2 (step 616). The process uses the identifiers associated with each instruction to retire the executed instructions in the original sequential order (step 618), with the process terminating thereafter.

Accordingly, the illustrative embodiments described herein provide a computer implemented method, apparatus, and computer program product for increasing a number of instructions per clock cycle associated with a processor. The illustrative embodiments fold a plurality of non-sequential instructions within the set of sequential order instructions to form a folded instruction. The folded instruction is executed to form an executed instruction. The executed instruction is placed in a reorder buffer. The instructions within the reorder buffer are written to a register based on the sequential order of execution within the set of sequential order instructions. As a result, the illustrative embodiments increase the number of instructions performed per clock cycle associated with a processor using out of order instruction folding and retirement.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for increasing a number of instructions per clock cycle associated with a processor, the computer implemented method comprising:
   decoding a set of instructions to form a set of decoded instructions;
   separating within the set of decoded instructions a set of store type instructions from a set of non-store type instructions;
   folding a store type instruction within the set of store type instructions with a non-store type instruction within the set of non-store type instructions to form a folded instruction, wherein folding the store type instruction within the set of store type instructions with the non-store type instruction within the set of non-store type instructions to form the folded instruction comprises:
      placing the store type instruction and the non-store type instruction in a single line within an instruction queue of the execution unit to form the folded instruction;
   dispatching the folded instruction to an execution unit for processing;
   executing the non-store type instruction in the folded instruction during an execution stage of the execution unit to form an executed instruction;
   performing a store function of the store type instruction during a write back stage of the execution unit; and
   placing the executed instruction in a reorder buffer.

2. The computer implemented method of claim 1, further comprising:
   determining data dependencies between instructions within the set of decoded instructions to form a set of data dependencies wherein the store type instruction to be folded with the non-store type instruction is selected to not conflict with the set of data dependencies.

3. The computer implemented method of claim 2, further comprising:
   generating an out of order sequence instruction set from the set of decoded instructions using the set of the data dependencies;
   placing the out of order sequence instruction set in the instruction queue;
   executing instructions in the instruction queue sequentially to form executed instructions, wherein the store type instruction and the non-store type instruction folded within the folded instruction are executed in parallel and, wherein the store type instruction is executed during the write back cycle of the non-store instruction; and
   placing the executed instructions in the reorder buffer.

4. The computer implemented method of claim 1, further comprising:
   tagging each instruction within the set of decoded instructions with an identifier, wherein the identifier indicates the sequential order of execution associated with each instruction within the set of instructions, wherein the identifier comprises a unique group identification number that is used during the step of writing instructions within the reorder buffer to a register based on the sequential order.

5. The computer implemented method of claim 4, wherein the identifier further comprises a unique target identification number that is used for dispatching the out of order sequence instruction set in the instruction queue.

6. The computer implemented method of claim 3, further comprising:
dispatching non-folded store instructions within the set of decoded instructions to a separate store unit for execution in addition to dispatching the folded instruction to an execution unit.

7. A computer program product comprising:
a computer recordable storage medium including computer usable program code for increasing a number of instructions per clock cycle associated with a processor, the computer program product comprising:
computer usable program code for decoding a set of instructions to form a set of decoded instructions;
computer usable program code for separating within the set of decoded instructions a set of store type instructions from a set of non-store type instructions;
computer usable program code for folding a store type instruction within the set of store type instructions with a non-store type instruction within the set of non-store type instructions to form a folded instruction wherein the computer usable program code for folding the store type instruction within the set of store type instructions with the non-store type instruction within the set of non-store type instructions to form the folded instruction comprises:
computer usable program code for placing the store type instruction and the non-store type instruction in a single line within an instruction queue of the execution unit to form the folded instruction;
computer usable program code for dispatching the folded instruction to an execution unit for processing;
computer usable program code for executing the non-store type instruction in the folded instruction during an execution stage of the execution unit to form an executed instruction;
computer usable program code for performing a store function of the store type instruction during a write back stage of the execution unit; and
computer usable program code for placing the executed instruction in a reorder buffer.

8. The computer program product of claim 7, further comprising:
computer usable program code for determining data dependencies between instructions within the set of decoded instructions to form a set of data dependencies; wherein the store type instruction to be folded with the non-store type instruction is selected to not conflict with the set of data dependencies.

9. The computer program product of claim 8, further comprising:
computer usable program code for generating an out of order sequence instruction set from the set of decoded instructions using the set of the data dependencies;
computer usable program code for placing the out of order sequence instruction set in the instruction queue;
computer usable program code for executing instructions in the instruction queue sequentially to form executed instructions, wherein the store type instruction and the non-store type instruction folded within the folded instruction are executed in parallel and, wherein the store type instruction is executed during the write back cycle of the non-store instruction; and
computer usable program code for placing the executed instructions in the reorder buffer.

10. The computer program product of claim 7, further comprising:

computer usable program code for tagging each instruction within the set of decoded instructions with an identifier, wherein the identifier indicates the sequential order of execution associated with each instruction within the set of instructions, wherein the identifier comprises a unique group identification number that is used during the step of writing instructions within the reorder buffer to a register based on the sequential order the computer implemented method of claim.

11. The computer program product of claim 10, wherein the identifier further comprises a unique target identification number that is used for dispatching the out of order sequence instruction set in the instruction queue.

12. The computer program product of claim 9, further comprising:
computer usable program code for dispatching non-folded store instructions within the set of decoded instructions to a separate store unit for execution in addition to dispatching the folded instruction to an execution unit.

13. An apparatus comprising:
a bus system;
a communications system connected to the bus system;
a memory connected to the bus system, wherein the memory includes computer usable program code; and
a hardware processing unit connected to the bus system, wherein the hardware processing unit executes the computer usable program code to decode a set of instructions to form a set of decoded instructions; separate within the set of decoded instructions a set of store type instructions from a set of non-store type instructions; fold a store type instruction within the set of store type instructions with a non-store type instruction within the set of non-store type instructions to form a folded instruction, wherein in executing the computer usable program code to fold the store type instruction within the set of store type instructions with the non-store type instruction within the set of non-store type instructions to form the folded instruction the hardware processing unit further executes the computer usable program code to place the store type instruction and the non-store type instruction in a single line within an instruction queue of the execution unit to form the folded instruction; dispatch the folded instruction to an execution unit for processing; execute the non-store type instruction in the folded instruction during an execution stage of the execution unit to form an executed instruction; perform a store function of the store type instruction during a write back stage of the execution unit; and place the executed instruction in a reorder buffer.

14. The apparatus of claim 13, wherein the processing unit further executes the computer usable program code to determine data dependencies between instructions within the set of decoded instructions to form a set of data dependencies wherein the store type instruction to be folded with the non-store type instruction is selected to not conflict with the set of data dependencies.

15. The apparatus of claim 14, wherein the processing unit further executes the computer usable program code to generate an out of order sequence instruction set from the set of decoded instructions using the set of the data dependencies; place the out of order sequence instruction set in the instruction queue; execute instructions in the instruction queue sequentially to form executed instructions, wherein the store type instruction and the non-store type instruction folded within the folded instruction are executed in parallel and, wherein the store type instruction is executed during the write back cycle of the non-store instruction; and place the executed instructions in the reorder buffer.

16. The apparatus of claim 13, wherein the processing unit further executes the computer usable program code to tag each instruction within the set of decoded instructions with an identifier, wherein the identifier indicates the sequential order of execution associated with each instruction within the set of instructions wherein the identifier comprises a unique group identification number that is used during the step of writing instructions within the reorder buffer to a register based on the sequential order.

17. The apparatus of claim 16, wherein the identifier further comprises a unique target identification number that is used for dispatching the out of order sequence instruction set in the instruction queue.

* * * * *